Nov. 22, 1927.  F. W. TEMPLE  1,650,307
MOLDED ARTICLE AND METHOD OF AND APPARATUS FOR PRODUCING IT
Filed Aug. 1, 1927  5 Sheets-Sheet 1

Witness:
Harry R. L. White

Inventor
Fred W. Temple
By Hill & Hill
Attys.

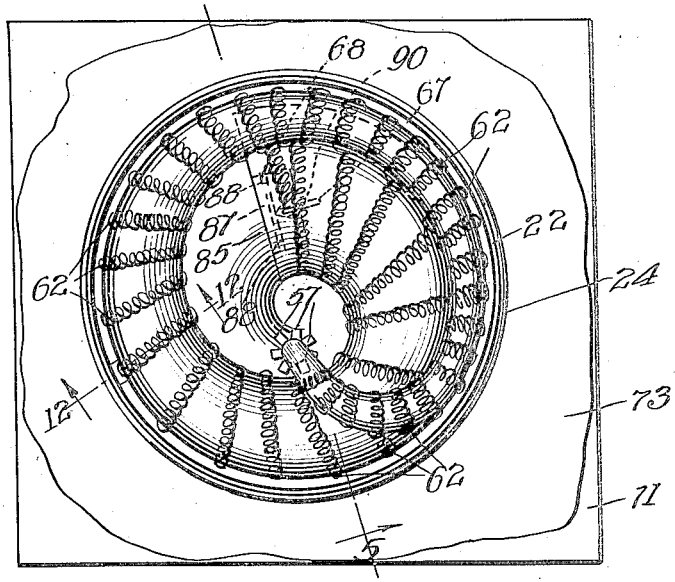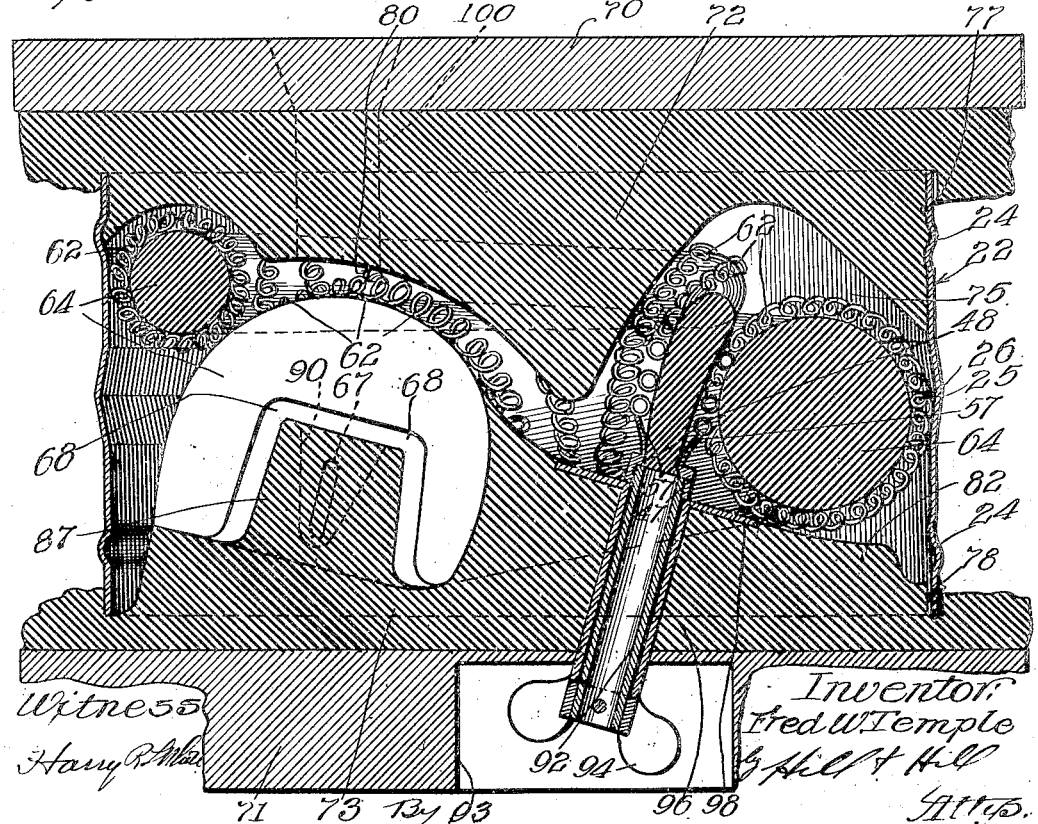

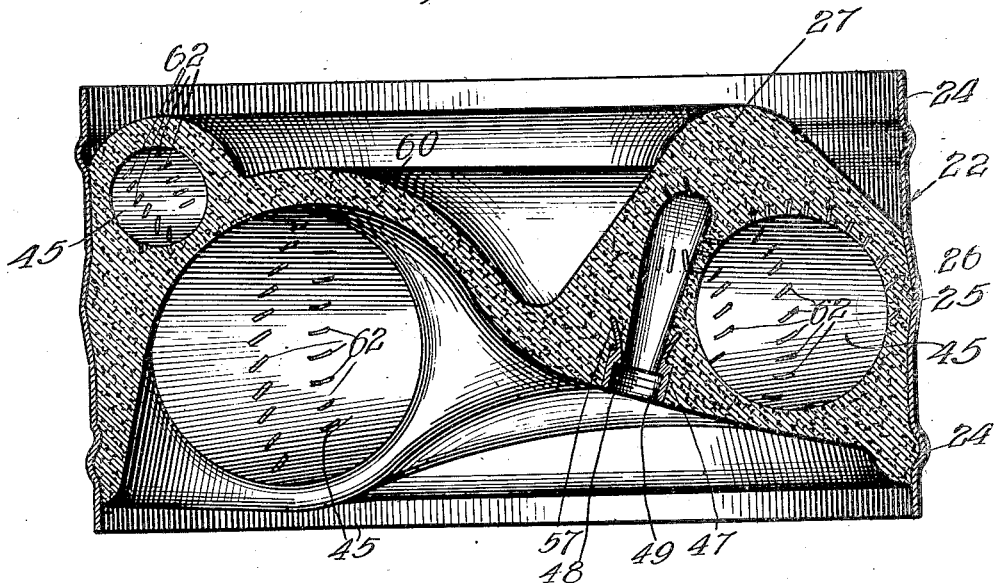
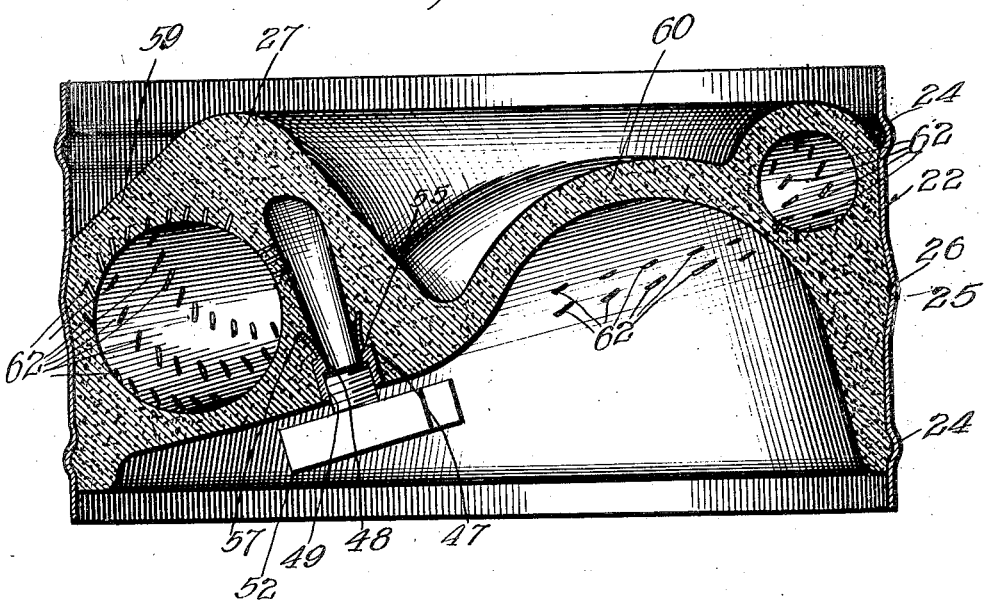

Nov. 22, 1927.　　　　　　　F. W. TEMPLE　　　　　　1,650,307
MOLDED ARTICLE AND METHOD OF AND APPARATUS FOR PRODUCING IT
Filed Aug. 1, 1927　　　　5 Sheets-Sheet 5
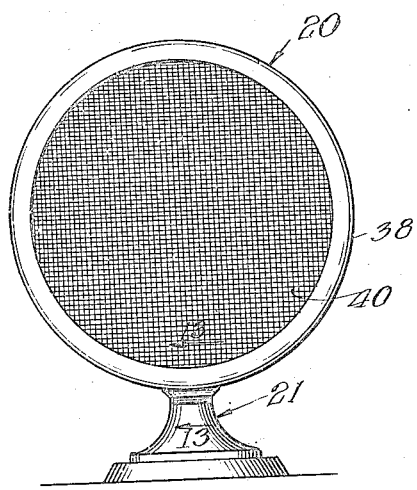
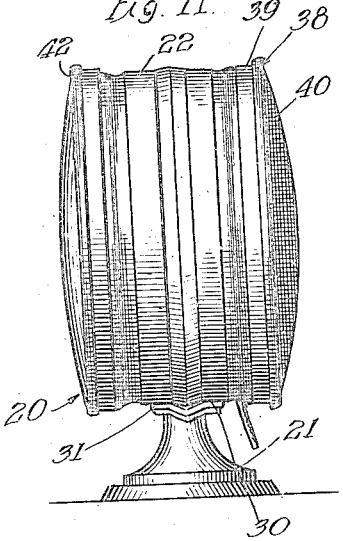
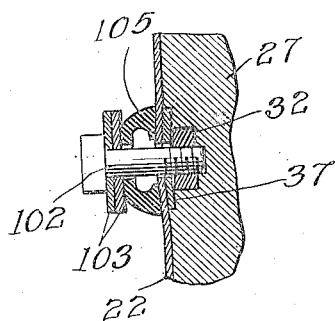
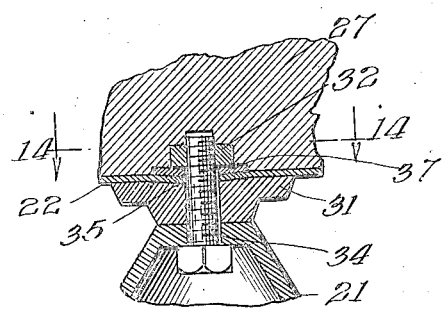
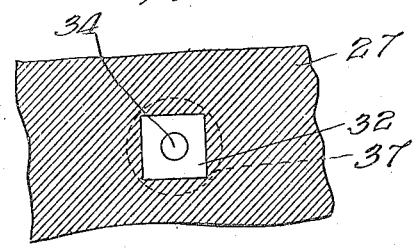
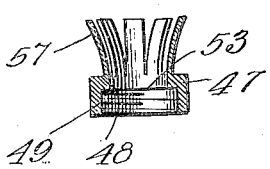
Witness:
Harry R. L. White
Inventor:
Fred W. Temple.
By Hill & Hill
Attys.

Patented Nov. 22, 1927.

1,650,307

UNITED STATES PATENT OFFICE.

FRED W. TEMPLE, OF CHICAGO, ILLINOIS, ASSIGNOR TO TEMPLE INC., OF CHICAGO, ILLINOIS, A CORPORATION OF ILLINOIS.

MOLDED ARTICLE AND METHOD OF AND APPARATUS FOR PRODUCING IT.

Application filed August 1, 1927. Serial No. 209,730.

My invention relates to molded articles and a method of and apparatus for producing them and particularly to molded amplifying horns and a method of and apparatus for producing the same.

A particular object of the invention is to provide improved construction for amplifying horns of the type shown in my copending applications, Serial Numbers 33,937 and 122,770, filed June 1st, 1925, and July 16, 1926, respectively.

Another particular object of the invention is to provide an improved method for molding articles having passages therethrough, the improved method being particularly adapted to be employed when circuitous or tortuous passages are to be formed in the molded articles.

Another particular object of the invention is to provide an improved method for producing molded amplifying horns.

Still another particular object of the invention is to provide improved means for holding a flexible core in place in a mold during the molding operation.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 4 is a plan elevation of part of my improved molding apparatus, one of the molding members which closes the top of the mold cavity during the molding operation being omitted from the drawing;

Fig. 5 is a section taken substantially on line 5—5 of Fig. 4 but in this instance, the upper molding member is shown in place to close the upper end of the mold cavity;

Fig. 8 is a section taken on line 8—8 of Fig. 6;

Fig. 9 is a section taken on line 9—9 of Fig. 6;

Fig. 10 is a front elevation of my improved amplifying horn;

Fig. 11 is a side elevation of my improved amplifying horn;

Fig. 12 is an enlarged fragmentary section taken on line 12—12 of Fig. 4;

Fig. 13 is an enlarged fragmentary section taken on line 13—13 of Fig. 10;

Fig. 14 is a section taken on line 14—14 of Fig. 13; and

Fig. 15 is a central longitudinal section taken through a nipple or insert which is preferably embedded in the molded part of each horn to hold the receiving unit.

Figure 1:
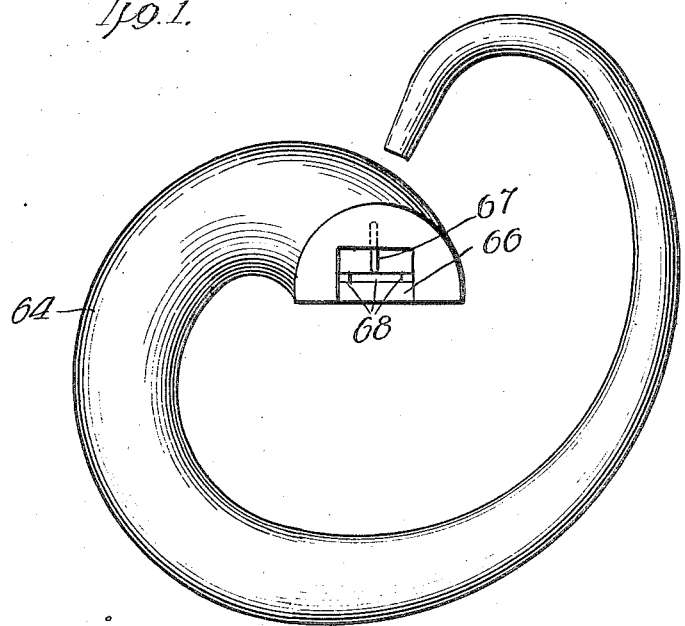
Fig. 1 is an elevation of a flexible core forming part of molding apparatus which embodies one embodiment of the invention.
Figure 2:
Fig. 2 is a side elevation of a helical spring which I preferably employ in connection with the flexible core shown in Fig. 1.

It is believed that a complete understanding of my improved method will be had from a description of apparatus whereby the method is practiced.

Referring for the present to Figs. 8 to 15, inclusive, wherein I have illustrated certain details of construction of my improved amplifying horn, it will be noted that the horn preferably comprises a substantially cylindrical body portion 20 which is mounted upon a suitable base 21. The body portion 20 preferably comprises a shell or housing member 22 which, in the preferred embodiments of the invention, is preferably cylindrical in form and is preferably constructed of sheet metal. As best shown in Figs. 8 and 9, the interior surface of the housing member 22 is preferably provided with annular grooves 24, or the equivalent, and with an annular groove 25, or the equivalent, which is disposed intermediate the annular grooves 24. The annular grooves 24 and 25 form annular shoulders and insure that a molded body 27 disposed within the housing 22 will not be accidentally displaced therefrom as portions of the molded body 27 project into the grooves. It will be noted that when the annular groove 25 is formed in the inner surface of the housing member 22, as outwardly projecting annular portion 26 is simultaneously formed upon the exterior surface of the housing member 22. The annular portion 26 preferably conforms to the shape of a substantially V-shaped groove 30 formed in an arcuate saddle 31 upon which the housing member 22 is mounted (see Fig. 11). The saddle 31 is preferably clamped between the housing member 22 and the base 21. Thus, a nut 32, or the equivalent, embedded in the molded body 27 is engaged by a bolt 34, or the equivalent, the head of which engages the base 21 (see Fig. 13). The shank of the bolt 34 preferably extends through suitable apertures formed in the base 21 and in the saddle 31 and through a suitable aperture 35 formed in the housing member 22. The shank of the bolt 34 also projects through a washer 37 which is also preferably embedded in the molded body 27. The construction is such that the bolt 34 cooperates with the nut 32 to rigidly secure the body portion 20 and the saddle 31 to the base 21.

The front end of the housing member 22 is preferably covered with a closure member or end device 38 which preferably comprises an annular member 39 engageable with the housing member 22 and a foraminous member 40 which is carried by the annular member 39. The other end of the housing member 22 is preferably closed by a sheet metal cover 42.

Figure 7:
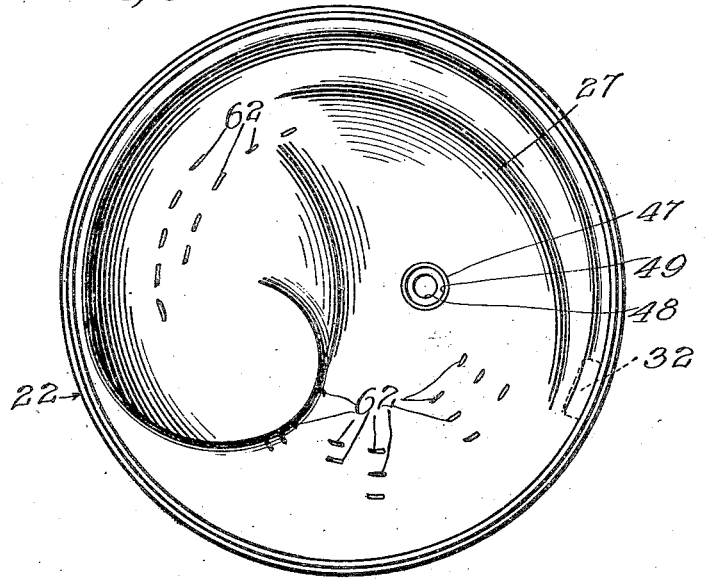
Fig. 7 is a front elevation of my improved amplifying horn as it appears before the front end is closed by a fabric or foraminous member and before the reproducing unit and the base are attached to the horn.

Referring to Figs. 8 and 9, it will be noted that the molded body 27 is provided with a more or less helically or spirally arranged tapering sound passage 45. As best shown in Fig. 7, the outer or discharge end of the sound passage 45 is relatively large and, by referring to the other figures, it will be noted that the sound passage gradually diminishes in diameter or cross-sectional area from the discharge end thereof to the other end thereof and that the latter end communicates with a tubular nipple 47 which is embedded in the molded body 27. As best shown in Figs. 9 and 15, the nipple 47 is provided, at its inner end, with a bore 48 which is preferably of the same diameter as the smaller end of the sound passage 45, the bore 48 being concentrically arranged with a bore 49 of larger diameter which is formed in the outer end of the nipple and forms an enlarged continuation of the bore 48. The bore 49 is preferably screw-threaded so that a reproducing unit 52 of the type commonly employed in amplifying horns, or the equivalent, may be secured to the nipple. A foraminous member or screen 53, or the equivalent, preferably rests upon an annular shoulder 55 formed between the bores 48 and 49 and is held in place thereon by the reproducing unit 52. This screen prevents dust, or the like, from drifting into the reproducing unit. As shown, the nipple 47 is preferably provided with integral lugs or fingers 57 which are arranged concentrically around the bore 48 and project into the molded body 27 to prevent accidental displacement of the nipple relative thereto. Another function of the lugs or fingers 57 will presently appear.

As illustrated in Figs. 8 and 9, a relatively small amount of molding material is employed to form the molded body 27, the arrangement being such that a wall 59 of suitable thickness is provided around the sound passage 45 throughout its length and a web 60 of molding material extends between the turns of the passage. Embedded in the wall 59 of the passage 45 are one or more helical springs 62 which lie in close proximity to the passage 45 and incidentally serve to reinforce the wall. The primary function of the spring or springs 62 is not to reinforce the structure but is rather to serve as spacing means for a flexible core 64 during the casting or molding operation.

The flexible core 64 is best shown in Fig. 1 and is preferably formed of a high grade glue comprising gelatine. Of course, the core 64 conforms to the shape of the sound passage 45, the core being tapered from one end thereof to the other end thereof. It will be noted that at its larger end, the core 64 is provided with a recess 66 and with an eye 67, or the equivalent, which has its shank embedded in the core. The eye 67 projects into the recess 66 and may be engaged by any suitable tool when the core is to be withdrawn from the molded body 27 after the molding or casting operation. I preferably provide the core 64 with an inwardly projecting flange or tongue 68 which is arranged in the recess 66 (see Figs. 1 and 4).

As best illustrated in Fig. 5, the mold in which the body 27 is molded preferably comprises upper and lower molding blocks or plates 70 and 71, respectively. Secured in any suitable manner to the molding blocks or plates 70 and 71 are molding members 72 and 73, respectively, which are preferably formed from material substantially identical with the material from which the core 64 is formed. The molding members 72 and 73 cooperate with the housing member 22 to provide a mold cavity 75, it being understood that each housing member 22 is employed in only one molding operation and that when the molded body 27 has been formed therein, the housing member remains permanently secured thereto. The molding members 72 and 73 are preferably formed with substantially cylindrical surfaces 77 and 78, respectively, which are adapted to fit snugly within the interior cylindrical surface of each housing member 22. The housing member 72 is provided with a molding surface 80 adapted to shape the rear surfaces of the molded members 27 and the member 73 is preferably provided with a molding surface 82 adapted to form the front surfaces or faces of the molded members 27. As best illustrated in Figs. 4 and 5, the member 73 is preferably provided with a relatively large integral extension or lug 85 adapted to form the mouths or larger openings of the sound passages 45, the extension or lug 85 being preferably provided with an integral lug 87 adapted to fit snugly within the recess 66 of the core 64. The lug 87 is preferably provided with a groove 88 adapted to accommodate the flange or tongue 68. When, as hereinafter explained, the core 64 is assembled with the member 73, the recess 66 in the larger end of the core is pushed over the lug 87 in such manner that the flange or tongue 68 seats in the groove 88 and thereby secures the core to the extension or lug 85. It will be noted that the lug 87 is provided with a recess 90 which is adapted to receive the eye 67.

During the molding or casting operation the aforementioned nipple 47 is held in place in the mold cavity 75 by means preferably comprising a tubular member 92 which projects through the member 73 and is provided with screw-threads at its inner end adapted to engage the screw-threads formed in the bore 49 of the nipple. The outer end of the tubular member 92 projects into a recess 93 formed in the bottom surface of the molding block or plate 71 and is provided with a handle member 94 whereby the tubular member may be rotated to unscrew it from the nipple. In the preferred embodiments of the invention, a tube 96 preferably extends through the member 73 and provides a permanent passage through which the tubular member 92 may be passed to have its screw-threaded end engage the nipple. The tube 96 is embedded in the member 73 and is not readily removable therefrom. It will be noted that the tube 96 is provided with an annular flange 98 at its inner end which forms part of the surface of the mold cavity 75.

In Fig. 12, I have illustrated apparatus which I employ during the molding operations to embed the nuts 32 in the molded bodies 27. As shown, I provide a bolt 102 adapted to be screw-threaded into the nuts 32 and adapted to hold the washers 37. Carried by the shank of the bolt 102 are one or more washers 103 and a flexible washer or flexible tubular member 105 which preferably fits loosely upon the shank of the bolt 102 and is adapted to be clamped between the washers 103 and the outer surface of the housing member 22. The arrangement is such that if during the molding operation any of the molding material flows out of the housing member 22 by way of the apertures 35, it will collect within the tubular member 105 and will now flow out upon the support upon which the molding apparatus is positioned as the tubular member 105 may be sufficiently compressed to form a liquid tight joint with the tubular member 22 and with the washer 103 engaged by it. The washer or tubular member 105 is preferably formed from rubber, or the equivalent.

Figure 3:
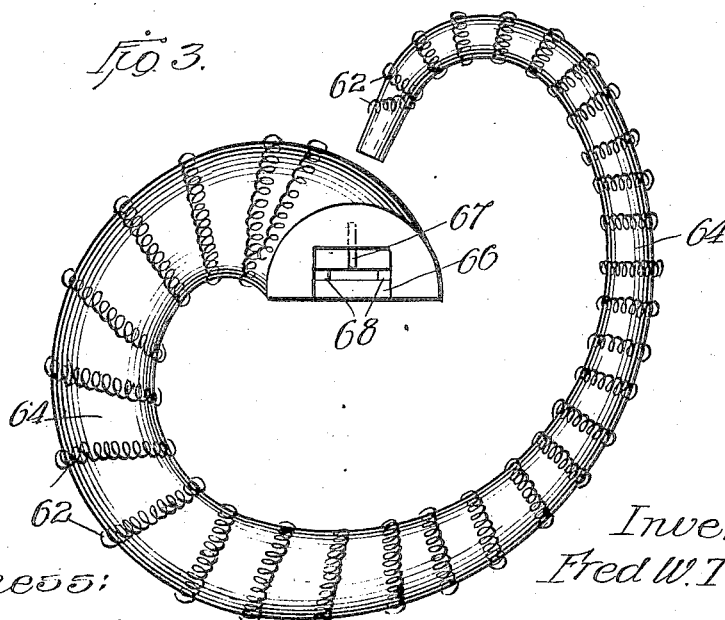
Fig. 3 is an elevation of the flexible core shown in Fig. 1, the helical spring illustrated in Fig. 2 being shown wrapped around the core.
Figure 6:
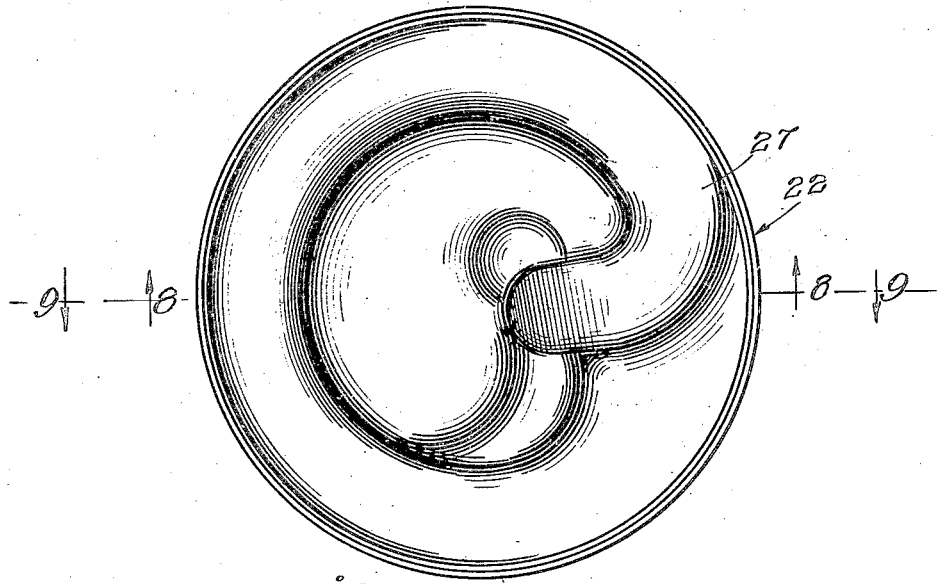
Fig. 6 is a rear elevation of my improved amplifying horn as it appears before the base is attached thereto and before the rear end is closed by a cover plate.

When a molded body 27 is to be formed in the above described molding apparatus, the operation is substantially as follows: The tubular member 92 is passed through the tube 96 and a nipple 47 is secured to its screw-threaded end in the manner illustrated in Fig. 5. The molding block or plate 71 and the molding member 73 carried thereby are then positioned upon any suitable support. The bolt 102, the washers 103 and the tubular member 105 are then employed to secure a nut 32 and a washer 37 to a housing member 22 which is then positioned upon the member 72 as illustrated in Fig. 5. Then, after greasing the core 64, I preferably wind one or more springs 62 around it in the manner illustrated in Figs. 3 and 4, it being readily understood that a relatively long spring 62 or a plurality of shorter springs 62 may be employed as desired. The core 63 is then positioned upon the member 73 in such manner that the lug 87 projects into the recess 66 and the flange or tongue 68 projects into the groove 88. In some instances I wind the spring 62 around the core after it has been assembled with the member 73. Then, as illustrated in Fig. 4, I coil the flexible core 64 in such manner that the smaller end thereof may be introduced into the bore 48 formed in the nipple 47. Of course, the lugs or fingers 57 serve as guides when the small end of the core is inserted in the bore 48 and also prevent lateral displacement thereof if it is accidentally withdrawn a short distance from the bore. It will be noted that the spring 62 spaces the core 64 from the interior cylindrical surface of the housing member 22 and that it spaces the superimposed turns of the core from each other, so that after the molded member 27 has been formed, one turn of the sound passage 45 will not communicate with another turn thereof through the wall which separates them. Obviously, the helical spring 62 permits the molding material to flow freely around the core 64 and becomes embedded in the molding material when it sets. It may be mentioned at this point in the description that I preferably form the molded members 27 from molding plaster or some equivalent or similar material.

After the core 64 has been properly arranged within the housing member 22, the molding material, which is in liquid state, is poured into the housing member 22 and then the molding plate 70 and its associated member 72 are positioned upon the upper end of the housing member 22 in the manner illustrated in Fig. 5. Any excess of molding material flows up through one or more risers 100 which extend through the member 72 and the molding plate 70. After the molding material is set, the molding apparatus is turned over so that the molding plate or block 70 rests upon the support, thus permitting the tubular member 92 to be rotated to disengage it from the nipple 47. The molding plate or block 71 and the member 73 are then lifted from the remaining molding apparatus and the eye 67 is engaged by any suitable tool (not shown) and the flexible core 64 is withdrawn from the newly formed molded body 27. In the next step of the molding operation, the operator removes the molding plate or block 70 and the member 72 from the housing member 22 and unscrews the bolt 102 so that the tubular member 105 and the washers 103 may be removed from the housing member 22. Each housing member 22 with its associated molded member 27 is then assembled with a reproducing unit 52 and with a base 21 in the manner illustrated in Figs. 10, 11 and 13.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A method of forming an amplifying horn, which method comprises assembling a reenforcing shell with molding apparatus in such manner that the shell forms part of a mold cavity, molding a body within the shell so that the shell forms a permanent housing therefor, and forming a sound passage in said molded body.

2. A method of forming an amplifying horn, which method comprises assembling a part of the horn with molding apparatus to form a mold, molding another part of the horn within said first-mentioned part to permanently secure it thereto, and forming a sound passage in said molded body.

3. A method of producing an amplifying horn, which method comprises assembling a housing part with molding apparatus to form a mold, molding another part of the horn within said housing part while it is assembled with said molding apparatus, and forming a sound passage in said molded part simultaneously with the molding thereof.

4. A method of positioning a flexible core in a mold cavity, which method comprises arranging a member around the core, and convoluting the core in the mold cavity in such manner that said member spaces the core from the walls of the mold cavity.

5. A method of positioning a flexible core in a mold cavity, which method comprises wrapping a spring around the core, and convoluting the core in the mold cavity in such manner that the spring spaces the core from the walls of the mold cavity.

6. A method of positioning a flexible core in a mold cavity, which method comprises wrapping a helically wound member around the core, and convoluting the core in the mold cavity in such manner that said helically wound member spaces the core from the walls of the mold cavity.

7. A method of positioning a flexible core in a mold cavity, which method comprises wrapping a helically wound member around the core, and curving said core in the mold cavity in such manner that the helically wound member prevents different parts of the core from contacting with each other.

8. A method of positioning a flexible core in a mold, which method comprises wrapping a flexible member around the core, and curving the core in the mold cavity in such manner that the flexible member prevents different parts of the core from coming into contact with each other.

9. A method of positioning a flexible core in a mold, which method comprises wrapping a spring around the core, and curving the core in the mold cavity in such manner that the spring prevents different parts of the core from coming into contact with each other.

10. A method of positioning a flexible core in a mold cavity, which method comprises positioning a spacing member around the core to be embedded in the molded article, and then convoluting the core in the mold cavity in such manner that said member spaces said core from the surfaces of the mold cavity.

11. An amplifying horn comprising a reenforcing housing member, and a body molded in said housing member and provided with a sound passage therethrough.

12. Molding apparatus comprising a molding block, an extension on said block, a lug projecting from said extension and provided with a groove, a flexible core provided with a recess adapted to accommodate said lug, and a flange on said core engageable with said groove.

13. An amplifying horn comprising a housing member, a body molded into said housing member and provided with a sound passage, an insert embedded in said body, a base, and means comprising a bolt screw-threaded into said insert for securing said housing member to said base.

14. A method of forming an amplifying horn, which method comprises casting a molded body in a shell in such manner that the shell forms a permanent housing for said body, and forming a sound passage in said body.

15. A method of forming an amplifying horn, which comprises assembling a housing member with molding apparatus in such manner that the housing member forms part of a mold cavity, arranging a flexible core in said mold cavity for forming a sound passage, pouring casting material into said mold cavity in such manner that it forms a molded body permanently secured to the shell, and removing said molding apparatus and said flexible core from said shell and molded body.

16. A method of producing an amplifying horn, which method comprises arranging a spaced member around a flexible core, convoluting the core in a cavity of a mold in such manner that said member spaces the core from the walls of said mold cavity, pouring casting material into said cavity to form a molded body, and removing said flexible core from said molded body to provide a tortuous sound passage therethrough.

17. A method of producing an amplifying horn, which method comprises arranging a spacing member around a flexible core, arranging the core in the cavity of a mold in such manner that said spacing member contacts and spaces different surfaces of the core from each other, pouring casting material into said cavity to form a molded body and removing said flexible core from said molded body to provide a tortuous sound passage therethrough.

18. An amplifying horn comprising a housing member, a body molded in said member and provided with a sound passage, and a foraminous member carried by and closing one end of said housing member to prevent dust or the like from entering said sound passage.

19. An amplifying horn comprising a reinforcing housing member, a molded body fixed in said member and conforming to the interior surface thereof, said body being provided with a sound passage beginning and terminating in an end of said molded body accessible through one end of the housing member, a reproducing unit mounted in one end of said passage, and a foraminous member secured to and closing said end of said housing member.

20. An amplifying horn comprising a reinforcing housing member having an annular shoulder formed therein, a molded body disposed in said housing member and provided with a sound passage therethrough, said molded body conforming to the interior surface of said member and having a portion engaging said annular shoulder to prevent displacement of said body relative to said housing member.

21. An amplifying horn comprising a housing having an aperture therein, a molded body disposed in said housing and provided with a sound passage, an insert embedded in said body, a base, and means projecting through said aperture and engaging said insert for securing said body to said base.

22. The herein described method of producing an amplifying horn, the steps which consist in fixedly securing one end of a flexible core with respect to the molding apparatus, convoluting said flexible core in a manner determining the shape of the passageway to be formed thereby and introducing the free end of the core through the convolutions thereof whereby to form a passageway within the resultant casting having its terminal ends opening in the same end of the casting, introducing casting material to the molding apparatus with the flexible core thus positioned, allowing it to harden, and finally effecting the removal of the core.

23. An amplifying horn, comprising a molded body having a sound passage therethrough, said sound passage having a large opening in one end of said body and having a convolution therein, the other end of said sound passage passing through said convolution and terminating in said end of said body.

24. An amplifying horn, comprising a molded body having a sound passage therethrough, said sound passage having a large opening in one end of said body and having a convolution therein, the other end of said sound passage passing through said convolution and terminating in said end of said body in close proximity to said large opening.

25. An amplifying horn, comprising a housing member, a body molded within the confines of said member and provided with a tortuous sound passage, said housing member having an edge portion projecting beyond said molded body, and an end device for said horn detachably secured to the said edge portion.

26. A method of casting an amplifying horn which consists in introducing a flexible tapered core having a spacing member disposed therearound to the molding apparatus, effecting a curvature of said core determining the shape of the passage formed thereby, introducing casting material to the molding apparatus and permitting the same to harden, and removing the flexible core from the molded element in such manner that the spacing element remains therein.

In testimony whereof, I have hereunto signed my name.

FRED W. TEMPLE.